United States Patent
Koh

(10) Patent No.: US 8,670,100 B2
(45) Date of Patent: Mar. 11, 2014

(54) DRIVING CIRCUIT AND LIQUID CRYSTAL DISPLAY MODULE HAVING THE SAME

(75) Inventor: Geun Woo Koh, Busan-si (KR)

(73) Assignee: LG Display Co., Ltd., Seoul (KR)

( * ) Notice: Subject to any disclaimer, the term of this patent is extended or adjusted under 35 U.S.C. 154(b) by 693 days.

(21) Appl. No.: 11/642,858

(22) Filed: Dec. 21, 2006

(65) Prior Publication Data
US 2008/0002131 A1 Jan. 3, 2008

(30) Foreign Application Priority Data
Jun. 30, 2006 (KR) .......................... 10-2006-0060202

(51) Int. Cl.
*G02F 1/1345* (2006.01)

(52) U.S. Cl.
USPC ............................................. 349/149; 349/150

(58) Field of Classification Search
USPC ................................................ 349/149–152
See application file for complete search history.

(56) References Cited

FOREIGN PATENT DOCUMENTS

| | | |
|---|---|---|
| CN | 1196957 | 4/2005 |
| CN | 1693947 | 11/2005 |
| JP | 03-289628 | 12/1991 |
| JP | 06-202136 | 7/1994 |
| JP | 08-242054 | 9/1996 |
| JP | 11-153964 | 6/1999 |
| JP | 2002-258789 | 9/2000 |
| JP | 2001-135896 * 5/2001 ............... H05K 1/02 |
| JP | 2001-135896 A | 5/2001 |
| JP | 2002-268574 | 9/2002 |
| JP | 2003-273476 | 9/2003 |
| JP | 2004-061715 | 2/2004 |
| JP | 2006-018220 | 1/2006 |
| TW | 525251 | 3/2003 |
| TW | 561297 | 11/2003 |
| TW | 200527976 | 8/2005 |

* cited by examiner

*Primary Examiner* — Kevin S Wood
(74) *Attorney, Agent, or Firm* — McKenna, Long & Aldridge, LLP.

(57) ABSTRACT

A driving circuit of a liquid crystal display module includes a substrate, a driving chip, a plurality of circuit lines connected to the driving chip, and a dummy pattern disposed outside the circuit lines parallel thereto. The liquid crystal display module includes a display panel, and a driving circuit. The display panel includes an effective pixel region, a non-effective pixel region, a display device displaying an image in the effective pixel region, and signal lines connected to the display device and extending to the non-effective pixel region. The driving circuit includes a substrate, a driving chip, circuit lines, and a dummy pattern disposed outside the circuit lines parallel thereto. The circuit lines each have one end connected to the driving chip and the other end connected to the signal lines. Accordingly, the dummy pattern can reduce defective images caused by the circuit lines damaged by mechanical impact.

10 Claims, 5 Drawing Sheets

DRIVING CIRCUIT AND LIQUID CRYSTAL DISPLAY MODULE HAVING THE SAME

This application claims the benefit of the Korean Patent Application No. 2006-0060202, filed on Jun. 30, 2006, which is hereby incorporated by reference for all purposes as if fully set forth herein.

BACKGROUND OF THE INVENTION

1. Field of the Invention

The present invention relates to a driving circuit, and a liquid crystal display module having the same.

2. Description of the Related Art

An electronic display device displays information generated from various electronic devices as an image. Recently, electronic display devices have been developed to have a large size and a thin profile. Furthermore, as a chip on flexible printed circuit (COF) technology has been developed, the electronic display device has a thinner profile.

The COF is manufactured by mounting a semiconductor chip directly on a film type circuit board. The COF is advantageous in that a film which is thinner than that of a related art tape carrier package (TCP) may be used, and leads to which a signal is applied may be arranged at intervals shorter than those in the TCP.

FIG. 1 is a plan view illustrating a liquid crystal display (LCD) module employing the related art COF. FIG. 2A is an enlarged perspective view of part A' of FIG. 1, and FIG. 2B is a cross-sectional view taken along line II-II' of FIG. 1.

Referring to FIG. 1, a related art LCD module 501 includes a LCD panel 510 displaying an image. The LCD panel 510 includes driving circuits 600 for driving a display device therein. The driving circuits 600 are disposed on an edge of the LCD panel 510.

Each of the driving circuits 600 includes a substrate 630, a driving chip 610, and circuit lines 620. The driving chip 610 is disposed on the substrate 630 having a film shape, and the circuit lines 620 are electrically connected to the driving chip 610 disposed on the substrate 630.

The driving circuit 600 transmits a driving signal processed by a printed circuit board (PCB) to the LCD panel 510.

Referring to FIGS. 2A and 2B, the LCD panel 510 and the driving circuit 600 are electrically connected together by an anisotropic conductive film (ACF) 640.

The LCD panel 510 includes a plurality of thin film transistors (TFTs) (not illustrated) and pixel electrodes (not illustrated) connected to the TFTs. The TFT provides a pixel voltage to the pixel electrode in response to a driving signal applied from the driving circuit 600.

The LCD panel 510 includes signal lines 525 electrically connected to the thin film transistors, and pad portions 520 provided at respective ends of the signal lines 525 and electrically connected to the respective circuit lines 620 of the driving circuit 600. Each circuit line 620 of the driving circuit 600 overlaps each signal line 525 of the LCD panel, and the circuit line 620 and the signal line 525 are electrically connected together by the ACF 640. The ACF 640 includes fine conductive balls.

Since the related art driving circuit 600 is formed on the substrate 630 having the film shape, the driving circuit 600 is advantageous in that it can be bent or folded. Furthermore, since the driving circuit 600 can be folded or bent, the entire size of the LCD module 501 can be reduced.

However, when the driving circuit 600 is folded or bent, the circuit lines 620 formed on the driving circuit 600 may be damaged or cut.

FIG. 3A is a plan view illustrating a related art LCD module having a PCB, and FIG. 3B is an enlarged view of part 'B'.

Referring to FIG. 3A, the LCD module 501 includes a plurality of driving circuits 600 on an edge of the LCD panel 510, and a PCB 700 electrically connected to the driving circuits 600.

The LCD panel 510 and the driving circuits 600, and the driving circuit 600 and the PCB 700 are electrically connected together by anisotropic conductive films, respectively. To attach the PCB 700 to the driving circuit 600 with the anisotropic conductive film, heat and pressure are applied to the anisotropic conductive film. Also, after the PCB 700 and the driving circuit 600 are attached, the PCB 700 is cooled. Thus, the PCB 700 electrically connected to the driving circuit 600 expands when electrically connected to the driving circuit 600, while it is heated, and contracts after the connection when it cools.

The expansion and contraction of the PCB 700 creates great stress at the LCD module 501, and cracks and damages may occur to the PCB 700 and the driving circuit 600 by such stress.

Otherwise, when vibration and impact are applied to the PCB 700 and/or the driving circuit 600, the PCB 700 and/or the driving circuit 600 may be easily damaged.

SUMMARY OF THE INVENTION

Accordingly, the present invention is directed to a driving circuit and an LCD module having the same that substantially obviate one or more problems due to limitations and disadvantages of the related art.

An object of the present invention is to provide a driving circuit capable of suppressing damage caused by stress, vibration, impact, and the like.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a driving circuit including: a substrate; a driving chip disposed on the substrate; a plurality of circuit lines connected to the driving chip; and a dummy pattern disposed outside the circuit lines parallel thereto.

In another aspect of the present invention, there is provided a liquid crystal display module including: a display panel including an effective pixel region, a non-effective pixel region disposed around the effective pixel region, a display device disposed in the effective pixel region and displaying an image, and signal lines connected to the display device and extending to the non-effective pixel region; and a driving circuit including a substrate, a driving chip disposed on the substrate, circuit lines each having one end connected to the driving chip and the other end being opposite to the one end and connected to the signal lines, and a dummy pattern disposed outside the circuit lines parallel thereto.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

Figure 1:
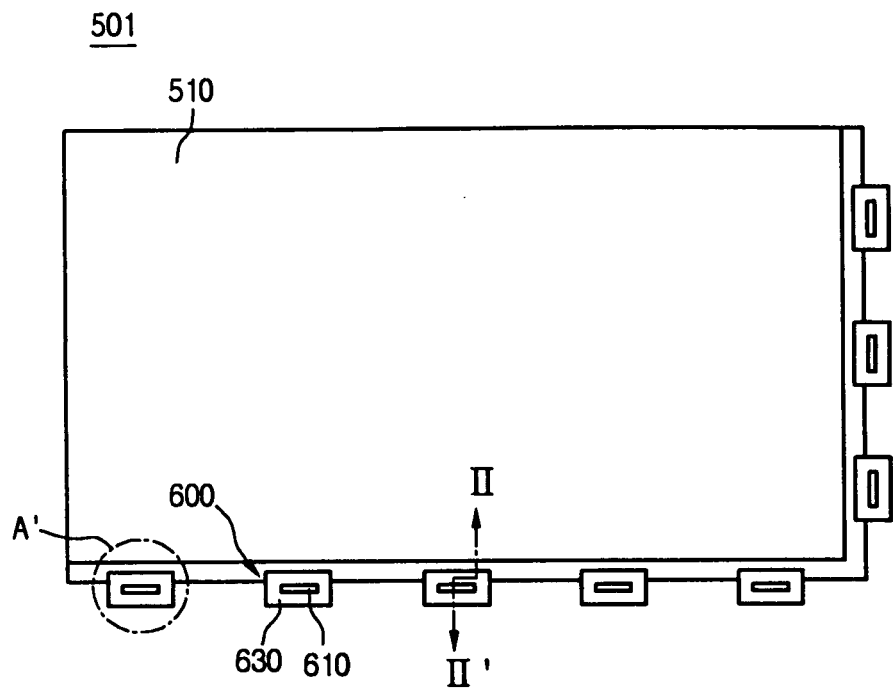
FIG. 1 is a plan view illustrating a related art LCD module.
Figure 2A:
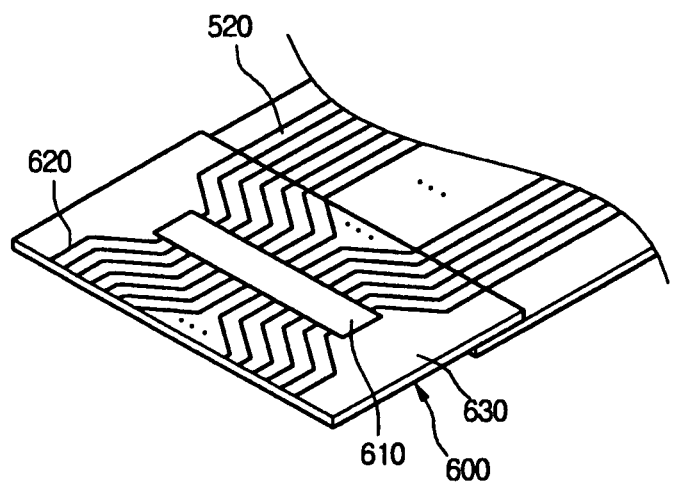
FIG. 2A is an enlarged perspective view of part A' of FIG. 2A.
Figure 2B:
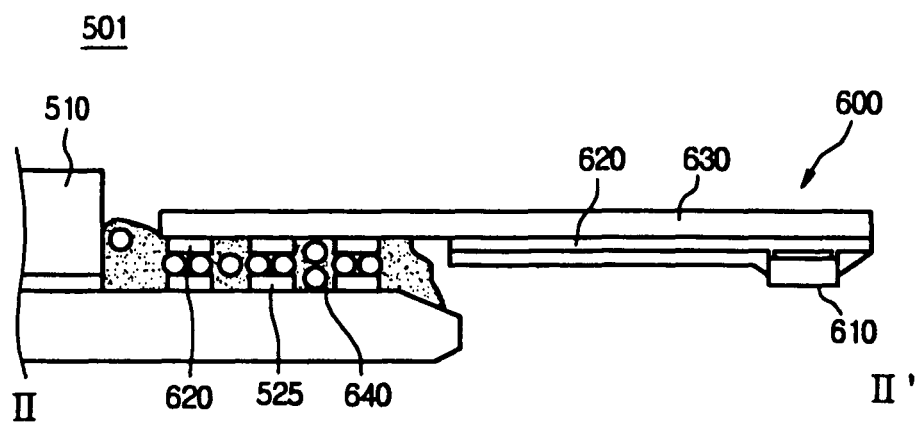
FIG. 2B is a cross-sectional view taken along line II-II' of FIG. 1.
Figure 3A:
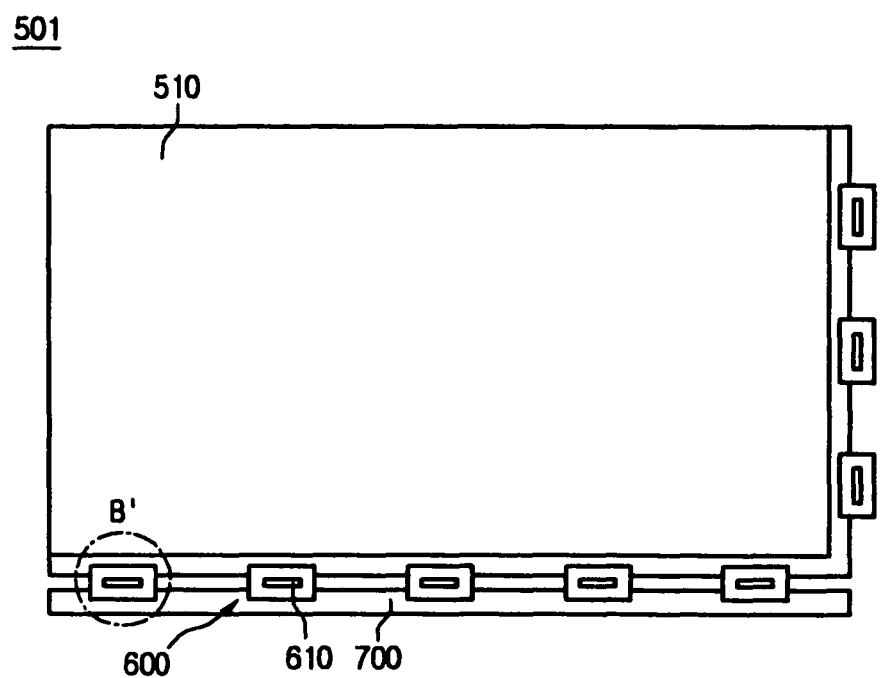
FIG. 3A is a plan view illustrating an LCD module to which a related art PCB is attached.
Figure 3B:
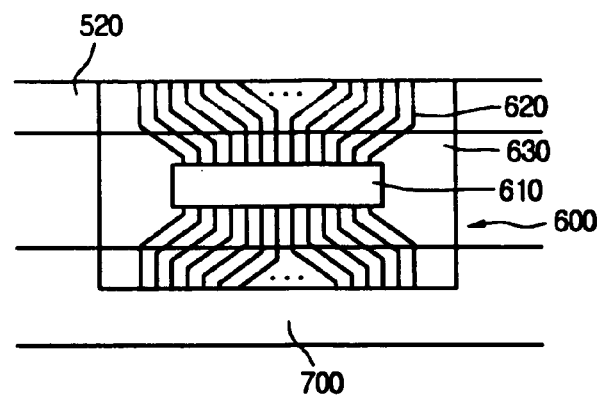
FIG. 3B is an enlarged plan view of part B' of FIG. 3A.
Figure 4:
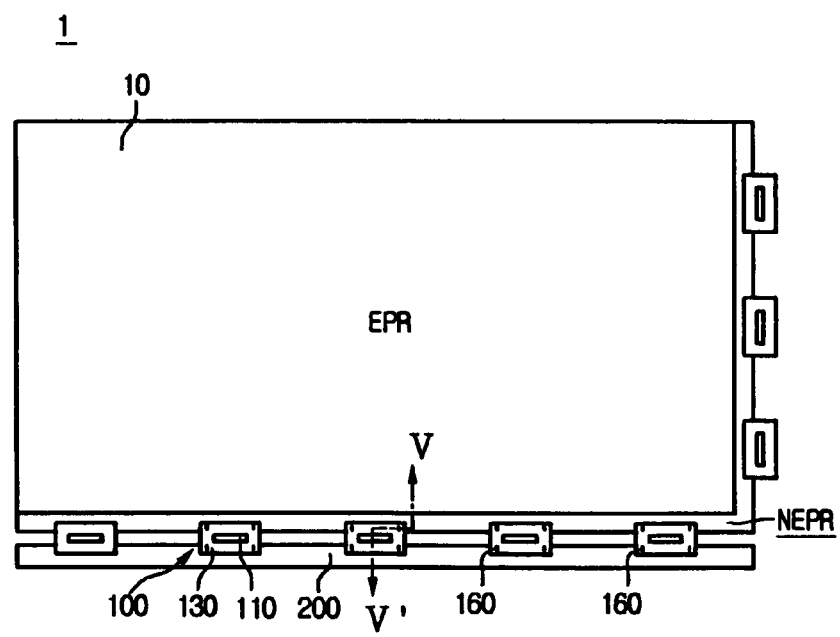
FIG. 4 is a plan view illustrating an LCD module according to an embodiment of the present invention.
Figure 5A:
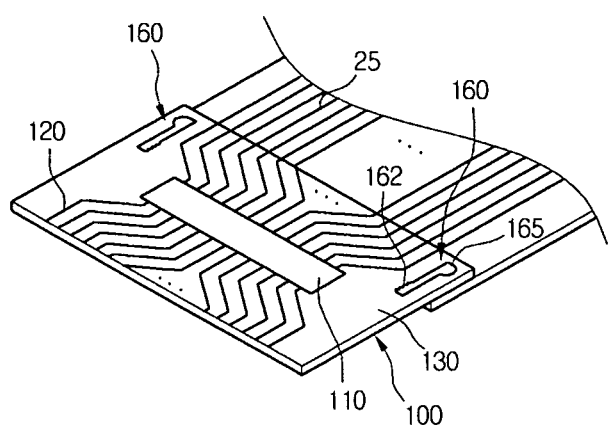
FIG. 5A is an enlarged perspective view of a driving circuit in FIG. 4.

FIG. 4 is a plan view illustrating an LCD module according to an embodiment of the present invention. FIG. 5A is an enlarged view illustrating part of a driving circuit in FIG. 4, and FIG. 5B is a cross-sectional view taken along line V-V' in FIG. 4.

Figure 5B:
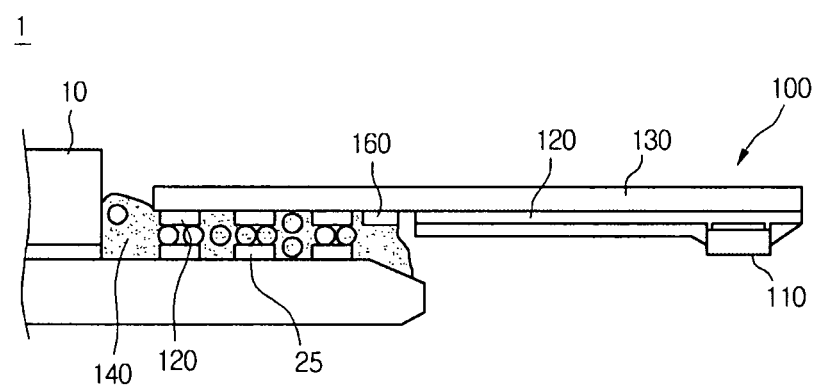
FIG. 5B is a cross-sectional view taken along line V-V' in FIG. 4.

Referring to FIGS. 4, 5A, and 5B, a liquid crystal display (LCD) module 1 includes an LCD panel 10 having a display device for displaying an image, a printed circuit board (PCB) 200 processing an image signal generated from an information processing device and generating a driving signal, and a driving circuit 100 providing a driving signal to the LCD panel 10.

The LCD panel 10 includes an effective pixel region (EPR), and a non-effective pixel region (NEPR). A plurality of display devices (not illustrated) is disposed on the EPR. The display device includes switching devices such as thin film transistors (TFT), and pixel electrodes electrically connected to the TFTs, respectively.

In order to supply to each TFT a driving signal generated from the driving circuit 100, signal lines are connected to the TFT. The signal lines extend to the NEPR from the EPR of the LCD panel 10.

Pad portions 25 electrically connected to circuit lines 120 of the driving circuit 100 are formed at ends of the signal lines, respectively.

At least one driving circuit 100 providing a driving signal to the display device is disposed in the NEPR of the LCD panel 10.

The PCB 700 receives an image signal generated from the information processing device to generate a driving signal.

The driving circuit 100 includes a substrate 130, a driving chip 110, circuit lines 120 (depicted in FIG. 5A), and a dummy pattern 160.

The substrate 130 is formed of a synthetic resin material having a small thickness, and has a rectangular shape substantially when viewed on the plane.

In detail, the substrate 130 is formed of a synthetic resin having a small thermal expansion coefficient, good flexibility, and a small thickness. An example of a material that may be used as the substrate 130 includes polyimide or the like.

The driving chip 110 is formed on the substrate 130, and applies a driving signal to the display device disposed in a pixel region of the LCD panel 10. The driving chip 110 may be mounted directly on the substrate 130, for example, by a surface mounting technology (SMT), for example.

The circuit lines 120 electrically connect the PCB 700 with the driving chip 110, and also electrically connect the driving chip 110 with the signal lines of the LCD panel 10. Examples of a material that may be used as the circuit lines 120 include copper, silver, for example.

In this embodiment, after a metal layer is formed on the substrate 130 by a sputtering or plating method, the metal layer is patterned to form the circuit lines at very small intervals.

Referring to again FIG. 5B, the circuit lines 120 of the driving circuit 100 are electrically connected to the pad portions 25 formed at ends of the signal lines of the LCD panel 10, respectively. Each circuit line 120 and each pad portion 25 are electrically connected by the anisotropic conductive film 140.

The anisotropic conductive film 140 includes a resin having adhesiveness, and fine conductive balls included in the resin. The pad portion 25 and the circuit lines 120 are electrically connected together by the conductive balls.

Referring to FIG. 5A again, dummy patterns 160 are disposed on the substrate 130 of the driving circuit 100.

The dummy pattern 160 according to one embodiment of the present invention is disposed outside the circuit lines 120 at a predetermined interval therefrom.

The dummy pattern disposed on the substrate 130 blocks and/or absorbs stress, vibration, impact and the like that are generated around the circuit lines 120, thereby preventing cracks and damages of the circuit lines 120 from occurring.

In the present embodiment, the dummy pattern 160 may be electrically disconnected with the pad portion 25.

In the present embodiment, the dummy pattern 160 may have a bar shape when viewed on the plane, and may be disposed substantially parallel to the circuit lines 120. The dummy pattern 160 may have a shape bent at least once, or a zigzag shape. Also, the dummy pattern 160 may have a zigzag shape or a shape bent at a right angle.

Figure 6:
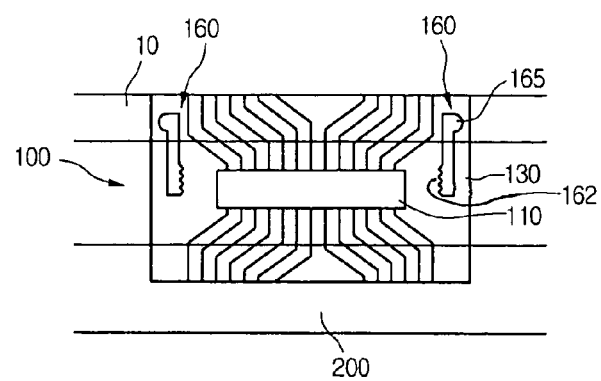
FIG. 6 is a plan view illustrating a dummy pattern reducing stress transmitted from an LCD module according to an embodiment of the present invention.

Referring to FIG. 6, to efficiently absorb stress, vibration and impact, the dummy pattern 160 may be formed in a connection region where the circuit lines 120 and the pad portions 25 overlap each other.

Also, to more efficiently absorb stress, vibration and impact, the dummy pattern 160 may further include an impact absorbing portion 165. The impact absorbing portion 165 may be formed by partially increasing an area of the dummy pattern 160 when viewed on the plane.

The impact absorbing portion 165 may have a semicircular plate shape when viewed on the plane. Otherwise, the impact absorbing portion 165 may have a triangular, quadrangular or polygonal shape when viewed on the plane.

In the present exemplary embodiment, the impact absorbing portion 165 may have various shapes. To remove static electricity generated around the circuit lines 120, the dummy pattern 160 may further include a static-electricity removing pattern 162. The static-electricity removing pattern 165 protrudes from a side of the dummy pattern 160 in the form of a saw tooth. The static-electricity removing pattern 162 may protrude from a side of the dummy pattern in the form of a bar, not the saw tooth.

In the present exemplary embodiment, the impact absorbing portion 165 is formed at one end of the dummy pattern 160, and the static-electricity removing pattern 162 may be formed at the other end facing the one end of the dummy pattern 160. The impact absorbing portion 165 and the static-electricity removing pattern 162 may be formed together at one end of the dummy pattern 160.

In the driving circuit and the LCD module having the same according to an embodiment of the present invention, the dummy pattern that can absorb mechanical impact is provided at the driving circuit, so that exposure of the circuit lines to the mechanical impact can be minimized.

Accordingly, the dummy pattern may reduce defective images that may be generated from the LCD module as the circuit lines are damaged by the mechanical impact.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A driving circuit of a liquid crystal display (LCD) device, comprising:
    a substrate;
    a driving chip disposed on the substrate;
    a plurality of circuit lines connected to the driving chip; and
    a dummy pattern disposed on the substrate outside the circuit lines and parallel to said circuit lines,
    wherein the dummy pattern is formed at the same level on the substrate as the circuit lines, and wherein the dummy pattern has an additional impact absorbing portion formed by partially increasing an area of the dummy pattern and a static-electricity removing pattern having a saw tooth shape.

2. The driving circuit according to claim 1, wherein the dummy pattern substantially has a bar shape to absorb stress, vibration and impact.

3. The driving circuit according to claim 2, wherein the dummy pattern has a bent portion that is bent at least once.

4. The driving circuit according to claim 3, wherein the dummy pattern has a zigzag shape.

5. The driving circuit according to claim 1, wherein the additional impact absorbing portion is formed at one end for further absorbing stress, and the static-electricity removing pattern is formed at the other end facing the one end of the dummy pattern for removing static electricity.

6. A liquid crystal display module comprising:
    a display panel including an effective pixel region, a non-effective pixel region disposed around the effective pixel region, a display device disposed in the effective pixel region and displaying an image, and signal lines connected to the display device and extending to the non-effective pixel region; and
    a driving circuit including a substrate, a driving chip disposed on the substrate, circuit lines disposed on the substrate each having one end connected to the driving chip and the other end being opposite to the one end and connected to the signal lines, and a dummy pattern disposed on the substrate outside the circuit lines parallel thereto,
    wherein the dummy pattern is formed at the same level on the substrate as the circuit lines, and wherein the dummy pattern has an additional impact absorbing portion formed by partially increasing an area of the dummy pattern and a static-electricity removing pattern having a saw tooth shape.

7. The liquid crystal display module according to claim 6, wherein the dummy pattern has a bar shape to absorb stress, vibration and impact.

8. The liquid crystal display module according to claim 7, wherein the dummy pattern has a bent portion bent at least once.

9. The liquid crystal display module according to claim 8, wherein the dummy pattern has a zigzag shape.

10. The liquid crystal display module according to claim 6, wherein the additional impact absorbing portion is formed at one end thereof for further absorbing stress, and the static-electricity removing pattern is formed at the other end facing the one end of the dummy pattern for removing static electricity.

* * * * *